Figure 1:
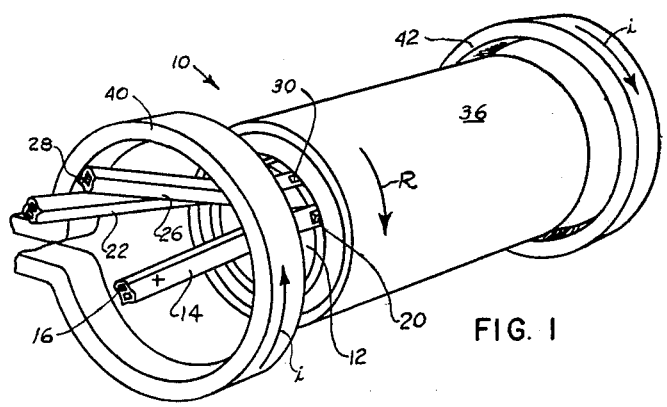

Feb. 2, 1965 G. J. YEVICK 3,168,041
FLUID IMPULSE MECHANISM AND METHOD
OF PRODUCING COLLISION REACTIONS
Original Filed April 20, 1959 4 Sheets-Sheet 1

INVENTOR.
GEORGE J. YEVICK
BY
Thomas J. Greer

*INVENTOR.*
GEORGE J. YEVICK

United States Patent Office 3,168,041
Patented Feb. 2, 1965

3,168,041
FLUID IMPULSE MECHANISM AND METHOD OF PRODUCING COLLISION REACTIONS
George J. Yevick, 536 Nordhoff Drive, Leonia, N.J.
Original application Apr. 20, 1959, Ser. No. 807,721, now Patent No. 3,084,629, dated Apr. 9, 1963. Divided and this application Apr. 30, 1962, Ser. No. 191,697
1 Claim. (Cl. 103—1)

This application is a divisional application of my co-pending application Serial No. 807,721, filed April 20, 1959, now U.S. Patent 3,084,629.

This invention relates to mechanisms for imparting motion to electrically conductive liquids. The force applied to the liquid is known as the Lorentz magnetic force and arises from the interaction of a current passed by the liquid and a magnetic field.

The invention displays utility as a means for producing neutrons and protons in collision reactions or processes involving various isotopes of the elements hydrogen, helium and lithium. For example, colliding high energy streams of deuterons, such as lighium deuteride streams, will yield neutrons or protons. As known to workers in the field of atomic physics, any device or scheme for producing these particles is useful in the study of atomic structure. A plasma may also arise during such collisions and hence the device also displays utility as a plasma generator.

The invention further displays utility in other arts. The device provides a simple yet dependable mechanism for accelerating gases in metal-burning torches. Another use is the pumping of liquid metals, such as sodium, as illustrated, for example, in U.S. Patent 2,558,698 to Wade.

Figure 2:
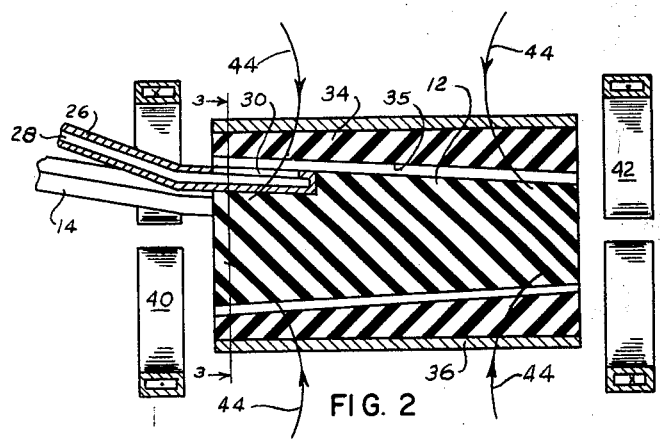
Figure 3:
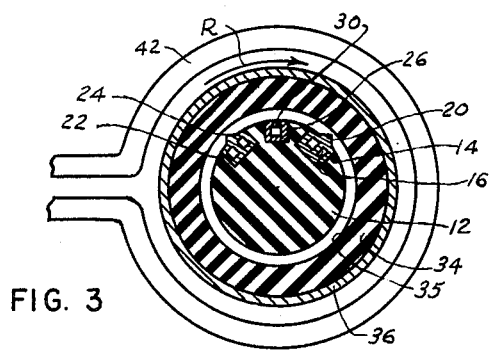
Figure 6:
Figure 7:
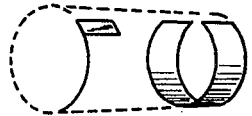
Figure 8:
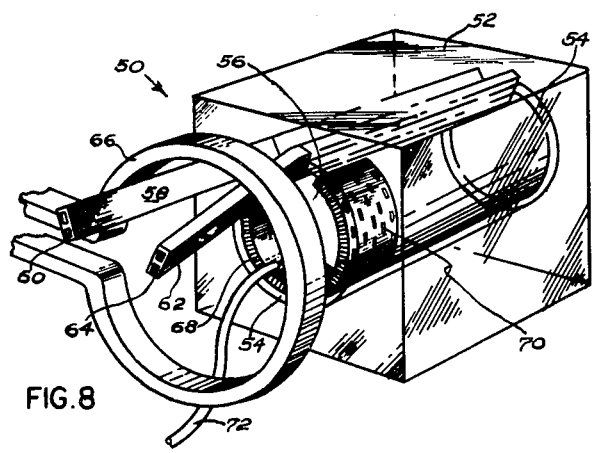
Figure 9:
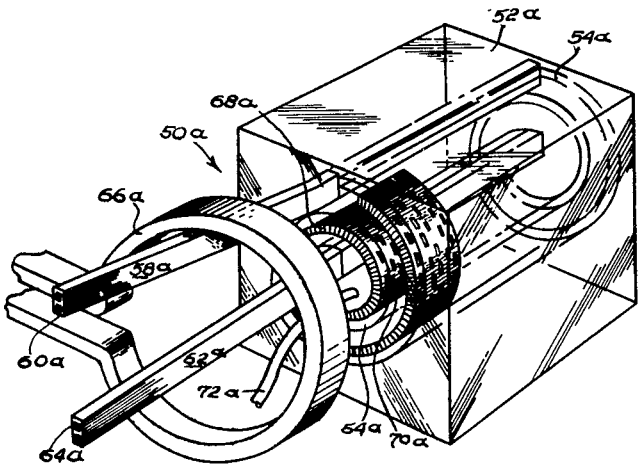
Figure 10:
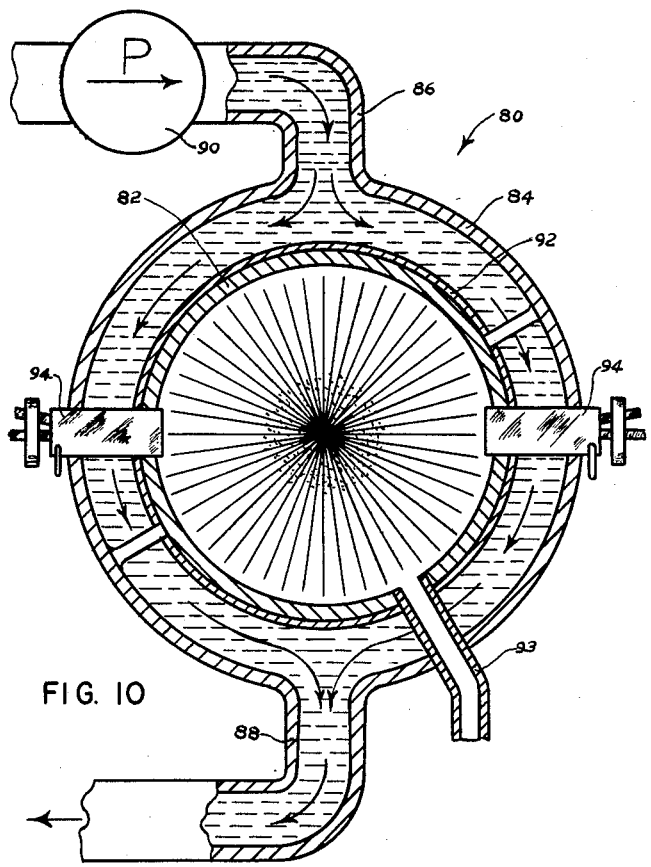

In the drawings:

FIGURE 1 is a perspective on one embodiment of the invention, the mechanism for rotating one of the elements thereof having been omitted, FIGURE 2 is a longitudinal cross-section of the embodiment of FIGURE 1, FIGURE 3 is a transverse cross-section of the embodiment of FIGURE 1, taken along line 3—3 of FIGURE 2, FIGURES 4 to 7 schematically illustrate the operation of the embodiment of FIGURE 1, FIGURE 8 is a perspective of another embodiment of the invention, FIGURE 9 is a perspective of a third embodiment of the invention, FIGURE 10 is a cross-section, partially schematic, of a device including any of the shown embodiments for producing neutrons and protons.

Referring now to FIG. 1 of the drawings, the numeral 10 denotes generally one embodiment of a fluid impulse mechanism of this invention and includes a fixed cylinder 12 formed of an electrical insulating material and provided with three longitudinal slots, the first and second of which extend the length of the element 12. The first of these slots receives the end of an electrode 14 having coolant passageways 16 and is provided with a rib 20. The second slot contains a similar electrode 22 which is of the same construction as that of 14, being provided with a corresponding rib 24, the ribs 20 and 24 also extending the length of cylinder 12. The third slot is between the first two and receives the end of a conduit 26 provided with a passageway 28. One side of this conduit is generally flush with the cylinder surface and is provided with an elongated orifice 30. Insulating septa may be placed between electrodes 14 and 22 if desired to preclude arcing therebetween.

A hollow cylinder 34 of ceramic or other insulating material having a complementary interior surface 35 is placed around the stationary member 12 and is provided on its exterior surface with a reinforcing cylinder 36 of steel or other material of high tensile strength. The axes of cylinders 12 and 34 are coincident, and by any suitable arrangement (not shown) the latter may be rotated at high speed, the reinforcing cylinder 36 precluding mechanical breakage of the ceramic due to centrifugal forces.

Two curved electrodes 40 and 42 adapted to carry high currents are each provided with an interior passage for the flow of a coolant and are situated away from the ends of the interior surface 35. These electrodes are fixedly spaced relative to the other described elements by any suitable mounting arrangement. As shown in the drawings, electrodes 14, 22 and conduit 26 pass through the plane of electrode 40.

The operation of this embodiment is as follows. The cylinder 34 is rotated at a high speed about its axis and, for the intended use of producing neutrons and protons or a plasma, lithium deuteride (or any electrically conductive fluid having a very low atomic number) under pressure in passageway 28 is emitted from the slot 30 and impinges upon the interior surface 35 of the rotating cylinder. It is then carried in the assumed direction of rotation (shown by the curved arrow R) past the rib 20 of electrode 14 until it is adjacent the rib 24 of electrode 22. At this stage, the lithium deuteride is in the form of a sheet or film held tightly against the interior surface 35 by virtue of centrifugal force and extends from one electrode rib to the other and in electrical contact with both. The sheet forms a junction between electrodes 14 and 22, and a large current passes therethrough.

Large currents in the directions indicated by the curved arrows $i$ (see FIG. 1) and the conventional cross and dot (see FIG. 2) are fed through encircling electrodes 40 and 42, giving rise to a magnetic field having magnetic flux lines 44. Because the electrodes 40 and 42 are placed slightly beyond the edges of the rotating cylinder, these lines penetrate the interior cylinder surface 35 substantially at right angles. Consideration of the well-known rule relating the direction of force on a conductor to its current and an adjacent magnetic field shows that the lithium deuteride sheet will be urged along the interior of the rotating cylinder 34 towards the remote or right-hand end (FIGS. 1 and 2). The magnitude of the force is proportional to the circumferential extent of the lithium deuteride sheet, i.e., the distance from electrode 14 to electrode 22, the current therethrough and the magnetic field due to current in electrodes 40 and 42. Very large currents in these electrodes are necessary for the desired magnetic field strength and hence resort to coolant through the electrodes is necessary.

The curved lithium deuteride sheet, now under the influence of the magnetic fields of the electrodes 40 and 42, accelerates toward the remote end of the rotating cylinder. Because the ribs 20 and 24 extend the entire length of the stationary member 12, the sheet experiences a Lorentz force until it emerges from the cylinder end.

Figure 4:
Figure 5:
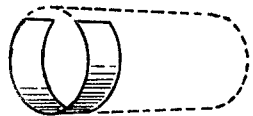

Reference to schematic FIGURES 4 to 7 illustrates a self-cyclic feature of the invention. In FIGURE 4 the deuteride sheet, formed by the liquid sprayed on rotating surface 35, has passed from opposite orifice 30, past electrode rib 20, nearly to electrode rib 24. In FIGURE 5 it is shown as just having reached rib 24. FIGURE 6 shows the sheet midway of the rotating cylinder as a result of very rapid acceleration due to the Lorentz force. In FIGURE 7 the sheet has traveled completely to the end of the cylinder and a new sheet is beginning to form.

The Lorentz force on the deuteride sheet due to the interaction of the current and magnetic field is given by $F=iLXB$ where $i$ is the current through it, L its length (circumferential extent), B the magnetic field strength and X the sine of the angle between the direction of the current and the direction of the magnetic lines of force. With the high magnetic fields and currents intended, the force on a sheet is very large and the final velocity is of great magnitude. The interior surface 35 may be tapered to insure a high density of the expelled liquid.

While two electrodes 40 and 42 have been shown, it will be understood that this merely increases the field strength given by one and hence a single may be used.

Adverting now to the embodiment of FIGURE 8, the numeral 50 generally denotes a second embodiment of the invention which includes a block 52 of insulating material, here shown transparent for purposes of illustration. A part cylindrical chamber 54 extends lengthwise of the block, the distant end opening into a face of the block. A part cylindrical member 56 defines, with the remainder of the block 52, the chamber 54. An electrode 58 having passages 60 therein for cooling purposes is placed along one longitudinal side of chamber 54, extending the length thereof, and diverges away from the near face of the block 52. A similar electrode 62 having coolant passages 64 is placed along the other longitudinal side of chamber 54. Similarly, it extends the length of the chamber and diverges away from the near face of the block 52.

A curved electrode 66, having coolant passages therein (not shown), is located adjacent and with its plane parallel to the near face of the block 52. Its perpendicular axis is coincident with the longitudinal axis of the chamber 54.

A cavity 68 denoted in part by radial shade lines lies interiorly of the near portion of chamber 54 and communicates therewith by virtue of slots or foramina 70. An inlet conduit 72 communicates with cavity 68 radially inwardly of chamber 54.

The operation of this embodiment is as follows. A large current passed through electrode 66 gives rise to a large magnetic field therearound. This field passes substantially at right angles through the walls of chamber 54, its direction being opposite at opposite ends of a diameter thereof.

Lithium deuteride is pumped into cavity, passes through the foramina 70, sprays outwardly therefrom onto the concave surface of chamber 54, and forms a curved sheet extending from electrode 58 to electrode 62. This sheet electrically connects the two electrodes and a large current commences to flow therethrough. Application of the well-known rule relating the (Lorentz) force on a conductor (the sheet), the direction of an external magnetic field (due to current in electrode 66) and the magnitude of the current through the conductor shows that for a certain current direction through 66 and through the sheet, the latter will be accelerated down the chamber 54, away from the reader, its ends contacting electrodes 58 and 62 throughout its travel.

The embodiment shown in FIG. 9 is similar to that of FIGURE 8, the corresponding elements of the former carrying the postscript $a$. The paramount structural difference is that the chamber 54a of this embodiment is spiral in cross-section. The electrodes 58a and 62a, the latter coinciding with the longitudinal axis of chamber 54a, are here radially spaced from one another since the chamber ends are similarly spaced. The initial whorl of the spiral communicates with electrode 62a. The advantage obtaining from the spiral cross-section being a longer fluid sheet element, i.e., lithium deuteride, for the same outside "diameter" and block length and hence a greater Lorentz force on the sheet. The mode of operation of this embodiment is essentially the same as that described with reference to FIGURE 8 and hence need not be repeated.

For the purpose of focusing, the chambers 54 and 54a may be tapered toward the remote end.

The desired magnetic field strength for any application of the device may be very high, requiring large currents in electrodes 40, 42, 66 or 66a. The desired current magnitude, which may be of the order of one million amperes, is much too large to be economically available in the steady state. Hence, recourse to a capacitor arrangement for giving such currents upon condenser discharge may be made. Other schemes for producing high currents over short-time periods, such as a homopolar generator, may also be used.

The current passing through the deuteride sheet is also extremely high. The greater its magnitude, the greater the final velocity of the sheet.

Each embodiment of the impulse mechanism exhibits the self-cyclic operation described with reference to FIGURES 4 to 7 as regards the feeding in and expulsion from the mechanism of the lithium deuteride. Upon the completion of a circuit path by the liquid sheet, the latter moves extremely rapidly along its path and out of the cylinder or spiral, as the case may be. The time for the liquid sheet's exit from the mechanism is very small both absolutely and compared to the time required for its formation. Consequently, the pumping of the lithium deuteride into the mechanism may be continuous, no timing or synchronizing valves or the like being required.

The above mode of operation results in the regular intermittent discharge of the liquid whose periodicity will depend upon the time taken to form the sheet and the time taken to discharge it.

The reader will note that while the above description has been set forth with lithium deuteride as the fluid, any conductive liquid as well as a gas may be employed for a specific intended use.

Referring now to FIGURE 10 of the drawings, a use of the invention involving collision reactions is shown. An apparatus 80, shown partially in cross-section and partially schematically, includes inner and outer concentric shells 82 and 84. Inlet and outlet conduits 86 and 88, the former adjacent a pump 90, communicate with the space between the shells. A coolant fluid passes through these described elements as depicted by the curved arrows. The outside of the inner shell is covered with a material 92 having a high capture cross-section, such as cadmium, for a purpose to be below described. An outlet conduit 93, for drainage purposes, leads out from the interior of shell 92.

At opposite ends of a diameter of apparatus 80 two fluid impulse mechanisms 94 are located. It is intended that the numeral 94 embrace any of the mechanisms of FIGURES 1 to 9. For ease and clarity of illustration, two such mechanisms are shown although their number may be increased, the mode of operation for a greater number being essentially the same as that which follows.

In operation, an isotope of hydrogen, helium or lithium in a pulsed stream emerges from the left mechanism 94 at great speed and impinges upon a like stream from the right mechanism 94. The nuclei in the two streams are of such velocity and density that their collision produces a reaction releasing neutrons and/or protons. If the collision is violent enough, i.e., the velocity of the colliding sheets great enough, a plasma (a gas composed of free electrons and ions in equal numbers charge-wise) is produced. Plasmas exhibit great utility in the study of astrophysical phenomena as well as the study of atomic structure.

To control heat attendant these collisions, the energy radiated (denoted by the radial lines) strikes the interior of the shell 82 where its absorption raises the temperature of the coolant fluid. Any neutrons attendant the collisions are controlled by being absorbed by the cadmium layer 92. Conduit 93 may be employed if desired to lead away any of the colliding streams which do not take part in the reactions.

It will be remembered that the deuterium emerges intermittently from each impulse mechanism, and hence the two mechanisms 94 will be synchronized so they fire at the same time.

I claim:

A method of imparting pulsed delivery to a conductive fluid comprising the steps of continuously projecting a sheet of conductive fluid across two spaced apart and elongated electrodes maintained at different electrical potentials, the sheet being of a width less than the length of the electrodes, and maintaining a magnetic field at right angles to the sheet of fluid, whereby the fluid sheet is urged along the electrodes upon its formation of an electrical path therebetween, the finite time required for the sheet to span the space between the electrodes resulting in a series of discrete, spaced apart sheets passing along the electrodes.

References Cited by the Examiner

UNITED STATES PATENTS

| | | | |
|---|---|---|---|
| 2,910,414 | 10/59 | Spitzer | 204—154.2 |
| 2,945,443 | 7/60 | Auer et al. | |
| 2,992,406 | 7/61 | Sharbaugh et al. | |
| 2,997,431 | 8/61 | Bell et al. | 204—154.2 |

LAURENCE V. EFNER, *Primary Examiner.*

REUBEN EPSTEIN, *Examiner.*